Feb. 28, 1928.
W. L. HARTZELL
1,660,965
PROTECTIVE SYSTEM
Filed Aug. 25, 1922
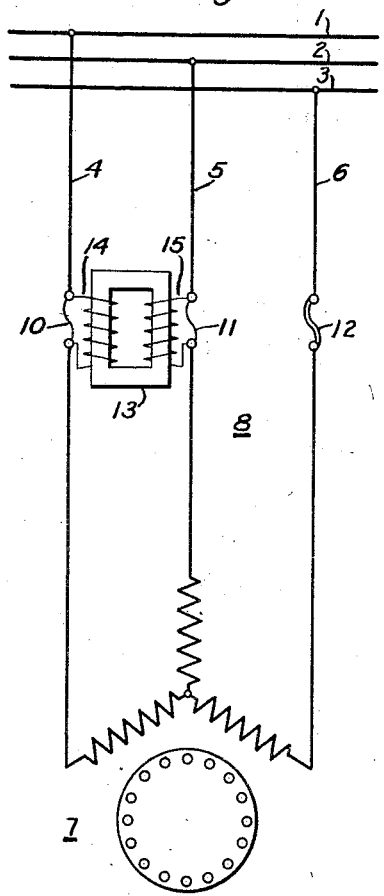
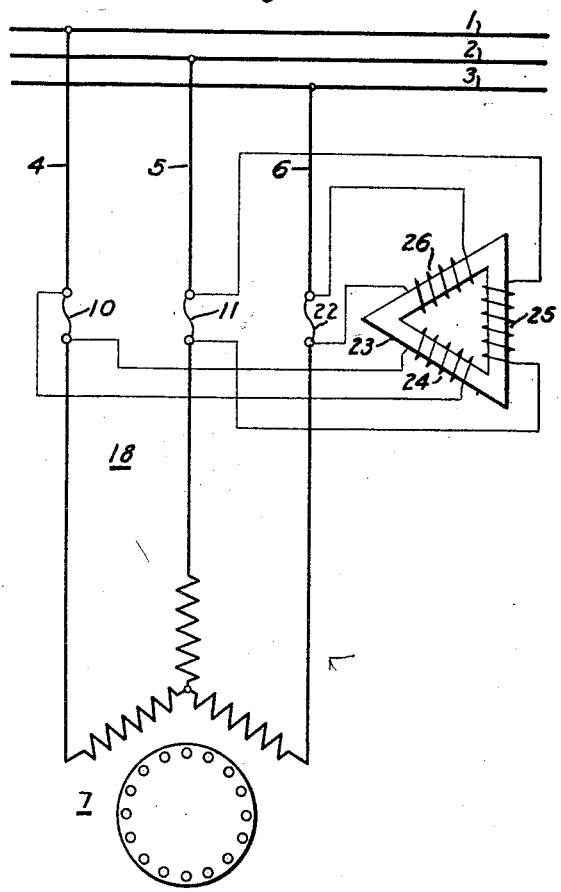
WITNESSES:
INVENTOR
Walter L. Hartzell
BY
William R. Coley
ATTORNEY Patented Feb. 28, 1928.

1,660,965

UNITED STATES PATENT OFFICE.

WALTER L. HARTZELL, OF CHICAGO, ILLINOIS.

PROTECTIVE SYSTEM.

Application filed August 25, 1922. Serial No. 584,179.

My invention relates to protective systems and it has particular relation to the prevention of abnormal operation of polyphase induction motors and the like.

One object of my invention is to provide a relatively simple and inexpensive arrangement for preventing the single-phase operation of a polyphase induction motor.

Another object of my invention is to provide a polyphase motor circuit or the like with a protective device embodying means for inductively interrupting one phase of the system upon an interruption of another phase.

Other and more specific objects of my invention will become evident from the following description taken in conjunction with the accompanying drawing wherein, Figure 1 is a diagrammatic view of a polyphase motor system equipped with a protective device constructed and arranged in accordance with my present invention, and Figure 2 is a similar view of a modification of the invention.

A large percentage of the burn-outs and similar failures of polyphase induction motors, for example, are due to the inadvertent single-phase operation thereof whenever a single fuse or circuit-breaker in one phase of the system opens that particular phase only. This condition may obtain either when the motor is first connected for the application of full supply-circuit voltage, or by reason of the occurrence of abnormal loads during the running period thereof.

My present invention is adapted to obviate the above-noted difficulties by means of a simple and inexpensive apparatus which may be very readily installed and, in fact, may be easily applied to existing installations.

Referring to Figure 1 of the drawing, the system here shown comprises a polyphase supply circuit including conductors 1, 2 and 3 for supplying energy to a branch or customer's circuit including conductors 4, 5 and 6 that are connected to a polyphase induction motor 7, for example. My protective device 8 is interposed between the supply circuit and the induction motor to be protected for preventing the single-phase operation thereof.

The protective device 8 comprises two circuit-interrupting means, such as fuses 10 and 11, or the equivalent, that are respectively connected in the branch conductors 4 and 5. These fuses are of normal rating, corresponding to the motor 7, while the third branch conductor or phase 6 may or may not be provided with a relatively heavy or high-capacity fuse 12, for a purpose to be set forth.

A transformer core member 13, preferably of the laminated type, is mounted intermediate the fuses 10 and 11 and is provided with a plurality of inductively related coils or windings 14 and 15, which are connected directly across the terminals of the normal-rating fuses 10 and 11, respectively. The coils 14 and 15 preferably comprise the same number of turns and, in brief, a 1/1 ratio transformer is thus interposed between the fuses 10 and 11.

However, the transformer device is normally inoperative by reason of the fact that the only voltage impressed upon the windings 14 and 15 is that corresponding to the normal voltage drop across the respective fuses 10 and 11. Consequently, the transformer device has practically no effect upon the normal operation of the fuses, but becomes active only after the rupture of either the fuse 10 or the fuse 11, as subsequently set forth in detail. Thus it would be permissible to use a fuse of substantially normal rating in each branch 4 and 5.

The operation of the protective device shown in Fig. 1 under "overload conditions" may be set forth as follows: During normal operating conditions practically no current will flow through the transformer coils 14 and 15, since the voltage impressed upon the coil terminals is merely the voltage drop from one end of the corresponding fuse to the other, which drop is, of course, relatively small. However, upon the occurrence of an overload current, the one or the other of the low-capacity fuses 10 and 11 will be ruptured by reason of the provision of the relatively large-capacity fuse 12 or no fuse at all in the branch conductor 6.

Assuming that the fuse 10, for example, first interrupts the current traversing the branch conductor 4, the practical short-circuit of the transformer winding 14 is thereby removed and the protective device will then act as a true transformer. Sufficient voltage will thereby be induced in the other transformer coil 15 acting as a secondary winding, to cause a relatively heavy current to traverse the low-capacity fuse 11 in addition to whatever current is already flowing therethrough to the motor winding.

In effect, the fuse 11 thus short-circuits the secondary winding 15 with the result that the fuse 11 is immediately ruptured. Both transformer coils 14 and 15 are now connected in circuit, but by reason of the construction and transformer operation of the protective device, only a small current—mostly magnetizing—will flow through the branch conductors 4 and 5 and the transformer windings. It will be understood that the transformer coils 14 and 15 will be designed of a capacity sufficient to permit the traversal of the necessary currents without sustaining any injury.

In this way two of the phases leading to the motor 7 are almost simultaneously opened, and the motor is thus stopped before any injurious single-phase operation thereof can occur, inasmuch as the magnetizing current in question will not be sufficient to operate or damage the motor.

It will be understood that a corresponding operation occurs in case the fuse 11 of the branch conductor 5 is first ruptured. In any event the fuse 12, if provided, by reason of the large capacity thereof, will not be ruptured, since the action just described will cause the fuses 10 and 11 to open two of the phases before the current is heavy enough to melt the fuse 12. It will be understood that fuse 12 is not essential to the protective operation, since in any event, two phases are opened.

Referring to Figure 2, the system here shown comprises the supply-circuit conductors 1, 2 and 3 and the branch or customer's circuit conductors 4, 5 and 6 for supplying energy to the induction motor 7 or the like. The fuses 10 and 11 are inserted in the branch conductors 4 and 5 as previously set forth, while a fuse 22 of similar capacity is introduced in the remaining branch conductor 6. The three phase circuits are thus protected by fuses of equal capacity.

A three-legged transformer core 23, which may be assembled in a triangular or any other suitable form, is provided with a plurality of coils 24, 25 and 26 that are wound upon the respective legs of the core and are connected across the terminals of the fuses 10, 11 and 22 respectively. In this way, the three fuses may be inductively and operatively interlinked whenever any one fuse ruptures.

The operation of this form of my invention will be evident from the previously described operation of the system that is shown in Fig. 1. In the event of an overload rupturing any one of the fuses 10, 11 and 22, the corresponding transformer coil, 24 for example, if the fuse 10 is ruptured, has sufficient potential impressed across its terminals to induce voltages of material value in the associated transformer coils 25 and 26, whereby a certain current is caused to traverse each of the fuses 11 and 22, supplementary to whatever current is already flowing therethrough, temporarily, to the motor windings. Consequently, the one or the other of the fuses 11 and 22 will be immediately ruptured to prevent the duration of single-phase operation of the motor 7.

I have thus provided a relatively simple and inexpensive protective device for absolutely preventing the single-phase operation of a polyphase translating device, such as an induction motor. My protective apparatus may be readily installed in a new equipment or applied to an equipment already in use. There are no moving parts to be maintained or adjusted and, after the operation of the protective device, the only renewals necessary are two of the ordinary-capacity fuses. Moreover, such renewals do not require any special type of fuse or any special rewiring or other adjustments. In other words, after the fuses have blown, it is merely necessary to reinsert similar fuses in the holding clips, the remainder of the protective apparatus requiring no attention whatsoever.

I do not wish to be restricted to the specific circuit connections, structural details or arrangement of parts herein set forth, as various modifications thereof may be effected without departing from the spirit and scope of my invention. I desire, therefore, that only such limitations shall be imposed as are indicated in the appended claims.

I claim as my invention:

1. Protective means for a polyphase translating device comprising interrupting means in each phase circuit, and a transformer rendered active upon the operation of one interrupting means for effecting the operation of another.

2. Protective means for a polyphase translating device comprising fuses in a plurality of phase circuits, and inductive means for materially increasing the current traversing one of said fuses upon a predetermined increase in the current traversing another.

3. Protective means for a polyphase translating device comprising fuses in a plurality of phase circuits, and a transformer for increasing the current in one fuse to the rupture point thereof upon a rupture of another fuse.

4. A polyphase circuit having a relatively high-capacity circuit-interrupting means in one phase and lower-capacity circuit-interrupting means in other phases, and means for effecting the operation of one lower-capacity means upon the operation of another.

5. A polyphase circuit having a relatively high-capacity fuse in one phase and lower-capacity fuses in the remaining phases, and means for inductively effecting the rupture of one low-capacity fuse upon the rupture of another.

6. A polyphase circuit having a relatively high-capacity fuse in one phase and lower-capacity fuses in two other phases, and a transformer connected to increase the current in either lower-capacity fuse to the rupture point upon the rupture of the other lower-capacity fuse.

7. A polyphase circuit comprising a relatively high-capacity fuse in one phase, lower-capacity fuses in other phases, and a transformer having a plurality of coils connected across the terminals of the respective low-capacity fuses.

8. A polyphase circuit comprising a plurality of fuses of different capacities, and means responsive to the rupture of one fuse for effecting the rupture of another fuse of the same capacity.

9. The combination with a polyphase translating device, of means responsive to the interruption of one phase for inductively and operatively interlinking all of the phases.

10. A three-phase circuit comprising circuit-interrupting means in each phase, and a transformer having a plurality of coils respectively connected across said means.

11. A three-phase circuit comprising a plurality of similar fuses in the several phases and a transformer having a plurality of coils respectively connected across said fuses, whereby upon the rupture of one fuse, said transformer becomes effective to increase the current in the other fuses to such a value that the one or the other remaining fuse is ruptured.

12. A three-phase-circuit having protective means in two phase circuits thereof, and a single transformer having only two coils, said coils being respectively connected to said protective means to effect the operation of both of said means under predetermined current conditions in said circuit.

13. A three-phase circuit having fuses in two phase circuits thereof, and a single transformer having only two coils, said coils being respectively connected across said fuses to effect the operation of both fuses under predetermined current conditions in said circuit.

14. A three-phase circuit having a relatively high-capacity fuse in one phase, lower-capacity fuses in the other two phases, and a transformer having only two coils, said coils being respectively connected across the low-capacity fuses to effect the operation of both of said fuses prior to any operation of said high-capacity fuse under predetermined current conditions in said circuit.

15. A polyphase circuit comprising a relatively high-capacity protective means in one phase, lower-capacity protective means in other phases, a magnetizable core, and a plurality of coils wound on said core and connected across the terminals of said lower-capacity means only.

16. A polyphase circuit comprising a relatively high-capacity fuse in one phase, lower-capacity fuses in other phases, a continuous magnetizable core, and a number of coils less than the number of phases wound on said core and respectively connected across the terminals of said lower-capacity fuses.

In testimony whereof, I have hereunto subscribed my name this twenty-first day of August, 1922.

WALTER L. HARTZELL.